United States Patent
Ghannam

(10) Patent No.: US 11,703,829 B2
(45) Date of Patent: Jul. 18, 2023

(54) SYSTEMS AND METHODS FOR FLEXIBLE MODULAR ASSEMBLY MANUFACTURING

(71) Applicant: Ford Global Technologies, LLC, Dearborn, MI (US)

(72) Inventor: Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 17/097,995

(22) Filed: Nov. 13, 2020

(65) Prior Publication Data
US 2022/0155756 A1 May 19, 2022

(51) Int. Cl.
*G05B 19/4155* (2006.01)
*G05B 19/416* (2006.01)

(52) U.S. Cl.
CPC ....... *G05B 19/4155* (2013.01); *G05B 19/416* (2013.01); *G05B 2219/31044* (2013.01); *G05B 2219/31274* (2013.01)

(58) Field of Classification Search
None
See application file for complete search history.

(56) References Cited

U.S. PATENT DOCUMENTS

| | | | | |
|---|---|---|---|---|
| 2005/0032471 A1* | 2/2005 | Pfarr | ...................... | B65G 43/08 452/181 |
| 2008/0015097 A1* | 1/2008 | Jaeger | .................. | B23Q 7/1415 483/15 |
| 2008/0103622 A1* | 5/2008 | Hanses | .................. | G06Q 10/06 700/116 |
| 2011/0178627 A1* | 7/2011 | Wechter | ........... | G05B 19/41875 700/109 |
| 2013/0325155 A1* | 12/2013 | Ryznar | ............. | G05B 19/41805 700/95 |
| 2015/0243013 A1* | 8/2015 | White | ..................... | G06F 3/011 382/103 |
| 2016/0342151 A1* | 11/2016 | Dey, IV | ............. | G05B 19/4155 |

(Continued)

OTHER PUBLICATIONS

Petrali, P., et al., "Edge Computing and Distributed Ledger Technologies for Flexible Production Lines: A White-Appliances Industry Case", *IFAC-PapersOnLine*, vol. 51, Issue 11, Year 2018, pp. 388-392, https://doi.org/10.1016/j.ifacol.2018.08.324.

(Continued)

*Primary Examiner* — Mohammad Ali
*Assistant Examiner* — David Earl Ogg
(74) *Attorney, Agent, or Firm* — Brandon Hicks; Kilpatrick Townsend & Stockton LLP

(57) ABSTRACT

A system and method are described herein for tracking and instructing assembly of flexible modular products on a single assembly line. The systems enable methods for tracking components and procedures as well as tools used in the assembly of components using various sensors and devices along the line. The systems also enable methods for instructing and tracking usage of tools for procedures. Data from various sensors, stations, nodes, and relating to each particular assembly item are stored in a distributed ledger that is verified and secured for use as a production log including each action taken on the assembly item which may later be used for audit purposes as well as to increase confidence in the assembly of product variations on the assembly line.

19 Claims, 9 Drawing Sheets

(56) References Cited

U.S. PATENT DOCUMENTS

| | | | | |
|---|---|---|---|---|
| 2018/0107198 A1* | 4/2018 | Linder | ................... | G06F 9/453 |
| 2018/0111214 A1* | 4/2018 | Garcia | .................. | B23K 9/025 |
| 2019/0339668 A1* | 11/2019 | Biernat | ................ | H04L 9/3239 |
| 2020/0298354 A1* | 9/2020 | Dietze | .................... | B23P 19/06 |

OTHER PUBLICATIONS

Isaja, M., et al., "Distributed Ledger Architecture for Automation, Analytics and Simulation in Industrial Environments", *IFAC-PapersOnLine*, vol. 51, Issue 11, Year 2018, pp. 370-375, https://doi.org/10.1016/j.ifacol.2018.08.321.

Wikipedia contributors. "IOTA (technology)." Wikipedia, The Free Encyclopedia. Retrieved on Nov. 13, 2020, from https://en.wikipedia.org/w/index.php?title=IOTA_(technology)&oldid=987973012, 10 pages.

Stackpole, B., et al., "Blockchain's Role in Factory Automation", *Automation World*, Mar. 29, 2019, 13 pages.

\* cited by examiner

SYSTEMS AND METHODS FOR FLEXIBLE MODULAR ASSEMBLY MANUFACTURING

BACKGROUND

Some products, including for example vehicles, are assembled on assembly lines to increase production efficiency and timeliness of production. Most assembly lines transfer a product from the start to finish of the assembly line through various stations where tasks are performed to assemble the final product in discrete stages. Each station includes a single or several discrete and repeated tasks for each product. Most assembly lines produce a single product in a single configuration due to difficulty of managing different product variations and assembly steps on a single production line and maintaining efficiency and performance of the assembly line.

SUMMARY

One general aspect includes an assembly system for producing one or more product variations of a product, the assembly system including a station having a set of tools for assembling the one or more product variations of the product. The assembly system also includes a conveyance system to carry an assembly item into and away from the station. The assembly system also includes a sensor positioned upstream of the station configured to detect an assembly item on the conveyance system and gather product information related to the assembly item. The assembly system also includes a computing device having a processor and a non-transitory memory having instructions stored thereon that, when executed by the processor, cause the processor to perform actions. The instructions cause the processor to receive product identity data of the assembly item from the sensor and determine a product variation of the assembly item based on the product identity data. The instructions also cause the processor to determine a procedure to perform at the station based on a station type and the product variation. The instructions further cause the processor to determine one or more tools of the set of tools required for the procedure and generate an instruction, for display at the station, instructing selection of the one or more tools. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for assembling product variations on a conveyance system, the method including receiving product identity data from a sensor positioned upstream of a station of the conveyance system. The method also includes determining a product variation based on the product identity data and determining a procedure to perform at the station based on a station type and the product variation. The method also includes determining one or more tools required to perform the procedure. The method also includes generating an instruction, for display at the station, instructing selection of the one or more tools from a selection of tools stored at the station. The method also includes determining a tool selected, such as a used tool, at the station to perform the procedure and storing an audit log in a distributed ledger, the audit log including the product identity data, the product variation, and the tool selected at the station. Other embodiments of this aspect include corresponding computer systems, apparatus, and computer programs recorded on one or more computer storage devices, each configured to perform the actions of the methods.

One general aspect includes a non-transitory computer-readable medium having instructions stored thereon that, when executed by one or more processors, cause the one or more processors to receive product identity data for an assembly item from a sensor positioned upstream of an assembly station along a conveyance system. The instructions further cause the processor to determine a product variation for the assembly item based on the product identity data and determine a procedure to perform at the assembly station based on a station type of the assembly station and the product variation. The instructions further cause the processor to determine one or more tools of a set of tools stored at the assembly station required to perform the procedure. The instructions also cause the processor to generate an instruction, for display at the assembly station, instructing selection of the one or more tools from the set of tools stored at the assembly station. The instructions also cause the processor to determine a tool selected at the assembly station to perform the procedure and store an audit log in a distributed ledger, the audit log including the product identity data, the product variation, and the tool selected. Other embodiments of this aspect include corresponding computer systems, apparatus, and computer programs recorded on one or more computer storage devices, each configured to perform the actions of the methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
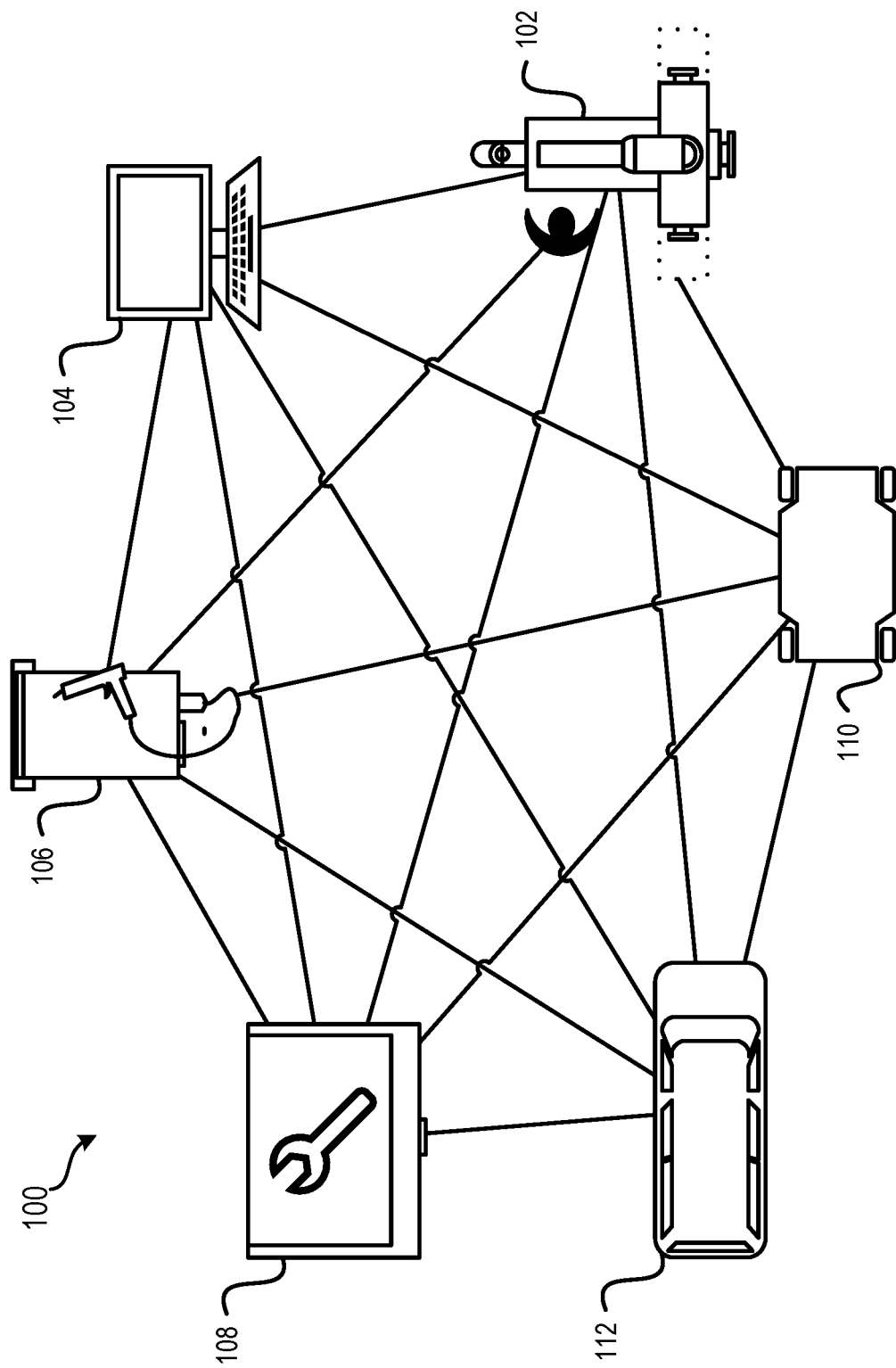
FIG. 1 illustrates an example system of elements in communication during assembly of a vehicle system using a flexible modular assembly system, according to some embodiments.

In some examples vehicles and other products are assembled based on flexible modular platforms. The flexible modular platforms maximize platform flexibility and minimize manufacturing cost and space. With respect to electric vehicles, a flexible modular platform may include a base structure, a top hat structure, and an interface. The flexible modular platforms enable exchangeability between different bases and top hats. To implement such modular assemblies, manufacturers may standardize tools and equipment to assemble different variations of the flexible modular platforms. However, in some instances, the various design requirements and functional requirements of the vehicles produced may dictate that some tools and equipment cannot be standardized. Rather than implementing different flexible modular platform assembly lines, with each only capable of performing a single variation of the product design, it is more efficient to produce all product variations on a single assembly line.

Along the assembly line are various stations where discrete tasks are performed on the various flexible modular platforms that are produced on the assembly line. In some examples more than one task or procedure using several tools is performed at a particular station. To maintain efficiency and speed of the assembly line, equipment and tools at the station may be confirmed for use based on the variability of the flexible modular platform. To increase audit performance and confidence in the flexible modular platform, data associated with the vehicle variation, confirmation of hardware components and software components added to the vehicle, and audit logs of the manufacturing steps are provided. The systems and methods described herein provide a robust method to exchange equipment at tools at a single station of the assembly line for different variations of a flexible modular platform. Due to the variations possible in the flexible modular platform, dynamic changes with respect to vehicle type produced, equipment used, tools used, and procedures performed may vary dynamically with different vehicles along the assembly line.

The description provided herein leverages different sensor systems and fuses information from the different sensor systems via a blockchain-based or other distributed ledger to secure interactions between the various vehicles produced on the assembly line and the equipment and tools at the assembly station. The use of the distributed ledger introduces verification possibilities as well as encryption possibilities which reduce the likelihood of incorrect installation or other potential errors that may be introduced along the assembly line.

Though described herein with respect to an assembly line, the systems and methods described herein may also be used for removal and testing of equipment from products produced on the assembly line or any other line-based manufacturing method.

In an illustrative example of a typical assembly procedure for flexible modular platforms, consider an assembly line used to produce products of a flexible modular platform along a single line, such that a single line is capable of producing multiple product variations without changing equipment or tooling of the assembly line. The assembly line is capable of dynamically changing product variations such that successive products may have entirely different variations. During assembly of the products, operators are entirely responsible for, and relied on, to switch between tools and equipment and perform procedures on the same station for different product variations. Errors with respect to product assembly are possible with such reliance on operators solely.

To improve confidence and robustness in the flexible modular platform assembly line, a distributed ledger is used to exchange data between networking peers including stations of the assembly line, sensors, tools, and hardware of the flexible modular platforms. Additional benefits of the systems and methods described herein include increased trust as described previously, improved response time, improved accuracy, and ease of action at stations of the assembly line.

In an illustrative example, the assembly line includes sensors at various locations along the assembly line including gates along the path. An initial gate is located at or near the outset of the assembly line to initialize an assembly item on the assembly line and move the assembly item towards the assembly station. A pre-entry station gate upstream of the station is set before the station with a travel time from the pre-entry station gate to the station at least equal to the longest operational time of the flexible modular platform configurations on the station. An in-station gate and out of station gate are positioned at the entry of and exit of the station. Each station may be equipped with one or more sensors to detect assembly items, identity data, configurations, equipment, and other features of the assembly items on the assembly line.

Within the distributed ledger, the manager, such as a computing system, and the various stations, tools, nodes, and equipment transmit and verify actions performed on the assembly line. The distributed ledger includes a full history of all components and history for assembly of the product. The distributed ledger creates a secure, non-modifiable history that is continually updated with new data and verified by the various nodes of the assembly line, ensuring the ledger is complete, non-modifiable, and secure. The use of a distributed ledger not only enables secure communication from the different nodes of the assembly line, but also enables generation of an audit log that may subsequently be used to audit production of the different products of the assembly line. This may be implemented for example with the computing system initializing a product for assembly, following the initialization, each component on the system accept the initialization and confirm availability for the assembly. The sensors at each gate and station are used to gather data that can be transmitted across the peer network and stored in the distributed ledger, including timestamps for various locations along the assembly line. In this manner, when any assembly item arrives at a station for assembly or partial assembly, each component of the system has confirmed the variation of the flexible modular platform, the procedures to be performed, the tools to be used, and stored all such data in the distributed ledger for future use and audit purposes.

At a particular station, due to the data accessible and confirmed within the distributed ledger, proper tools and procedures can be selected and identified for action based on the individual identity of the product. For example, the vehicle frame may arrive at a station where a battery is to be installed. Before arriving or upon arriving at the station, the computing device that manages the assembly line may instruct selection of particular tools required for installing the gas tank. In some instances this instruction may be presented on a screen or may be presented by illuminating or otherwise emphasizing a particular tool of the tools at the station. The instruction may cause a visual indicator to indicate selection of the particular tool. The instruction may, for example instruct insertion of eight bolts to hold the battery within the vehicle frame and may illuminate a light emitting device connected to a torque wrench to indicate the torque wrench will be used for the procedure. The instructions may include a number of foot-pounds to torque each bolt to and other such detailed instructions. In some instances, the torque wrench may be configurable such that the computing device is able to set the torque setting of the wrench based on the instruction. The torque wrench may also include sensors to monitor usage and confirm the torque wrench was actually selected and instructed and used for the task required.

Each such operation, such as the battery installation is recorded in the distributed ledger including timestamps, instructions provided, sensor data confirming tools used, and other such data. The distributed ledger can be audited to identify potential discrepancies and may be useful for future events, for example to confirm that certain parts or components were correctly installed.

Turning now to the figures, FIG. 1 illustrates a system 100 of elements in communication during assembly of a vehicle system using a flexible modular assembly system, according to some embodiments. The system 100 illustrates different nodes that may be in communication with one another over a local network. The different nodes will each have a record of the assembly items on the assembly line, including units at a particular station, approaching the station, leaving the station, and the sequence of different product variations on the assembly line will be known.

The system 100 includes a computer system 104 that acts as a system manager, a station 102 where assembly procedures take place, one or more tools 106 and 108 at the station 102, and different components for the product including a base 110 and a top hat 112 in the instance of a flexible vehicle assembly line. The computer system 104 may be a single computing device or a network of computing devices, for example such as computing device 900 and cloud computing system 1000 of FIGS. 9 and 10. The station 102 may include equipment and devices for use by personnel or automated devices to perform assembly tasks on the base 110. The base 110 and top hat 112 are illustrative of different vehicle components that may come together at station 102 along with other components for the vehicle. The base 110 and top hat 112 as well as other components are described in further detail with respect to FIGS. 2 and 3 below. The tools 106 and 108 may include connected tools, such as "smart" tools that include sensors and various components to communicate with computer system 104.

Figure 2:
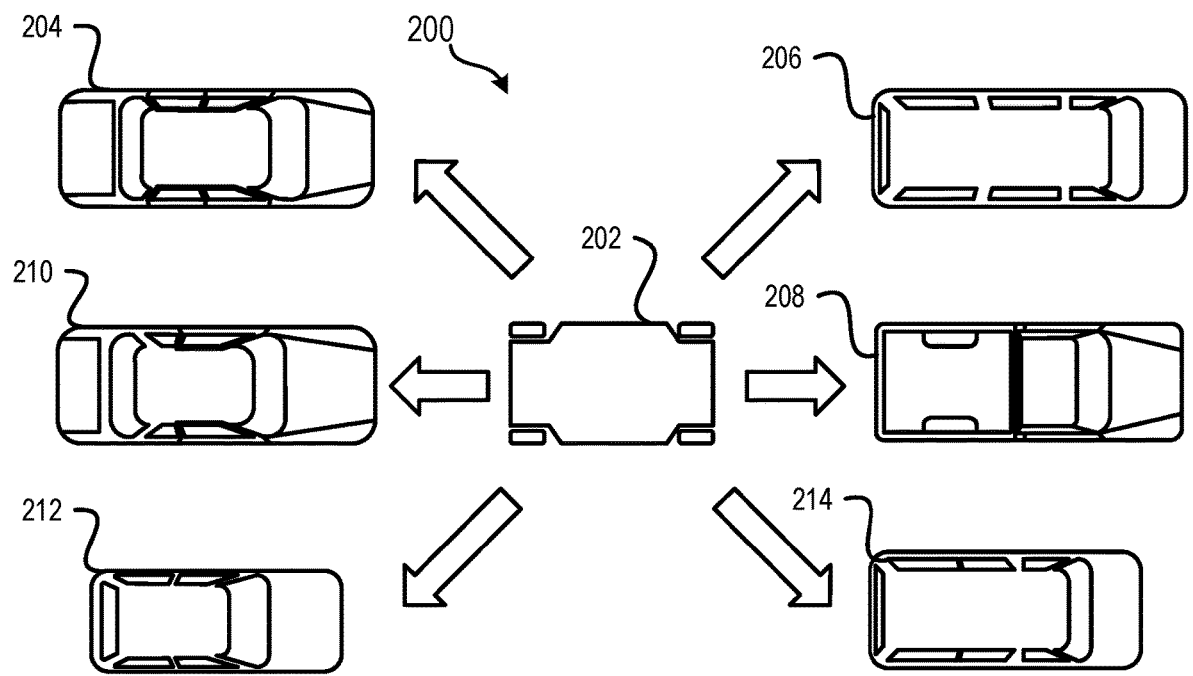
FIG. 2 illustrates an example of a flexible modular platform of a vehicle system assembled with a flexible modular assembly system, according to some embodiments.
Figure 3:
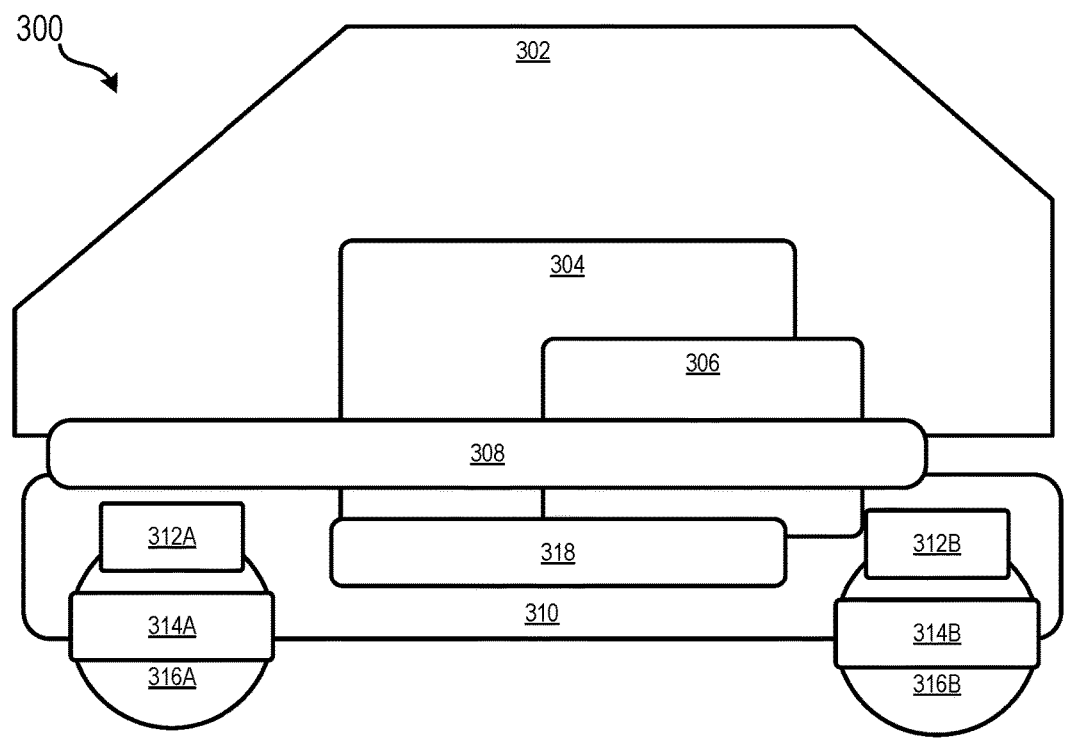
FIG. 3 illustrates a block diagram of a vehicle system including elements produced using a flexible modular assembly system, according to some embodiments.

FIGS. 2 and 3 illustrate representations of a flexible modular platform for a vehicle that may be assembled using an assembly line implementing the systems and methods described herein. The flexible modular vehicle may be an electric vehicle, as described with respect to FIG. 2 which enables greater interchangeability between various vehicle styles and designs using modular components than traditional vehicle designs.

FIG. 2 illustrates an example of a flexible modular platform of a vehicle system 200 assembled with a flexible modular assembly system, according to some embodiments. The vehicle system 200 may include a base 202 with flexible or adjustable dimensions, for example to adjust a length and/or width of a frame to accommodate different body styles. The different body styles may include small cars 212, large sport utility vehicles (SUVs) 210, medium compact utility vehicles (CUVs) 204, full size vans 206, pickup trucks 208, and small CUVs 214. Additional body styles may be produced for the base 202, enabling flexible and dynamic production of different vehicle types on a single assembly line. Other vehicle types may be produced that also interchange with the base 202, the above being examples of different varieties that may be produced with base 202.

To accommodate the different vehicle variations, base 202 may be adjustable, for example to adjust a width, height, and/or length of the frame or other components of the base 202. In this manner, a manufacturer may produce a base 202 that can be used in an assembly line to produce many different types of vehicles. Other components within the vehicle system 200 may be interchangeable or may be standardized across different variations. Such interchangeability, customizability, and modular flexibility provides great benefits for production of a large variety of vehicles while conserving resources. However, additional complications are introduced by the flexibility such that great care must be taken to ensure proper parts and procedures are used for the different vehicles produced off of a single assembly line.

FIG. 3 illustrates a block diagram of a vehicle system 300 including elements produced using a flexible modular assembly system, according to some embodiments. The vehicle system 300 includes a top hat 302, interior 304, electrical components 306, an interface 308, a base 310, suspension 314, drive components 312, wheels 316, and battery 318, in addition to other potential components that may be incorporated. The top hat 302 may include different body styles, such as the different body styles illustrated with respect to FIG. 2. The base 310 may be similar to the base 202 of FIG. 2 and may be of a fixed size and configuration or may be adjustable or of a variable configuration. The interface 308 provides connections between the top hat and base, physical as well as electrical connections. The interior 304 may include seats and other such interior parts, the electrical components 306 may include various electronic control units (ECUs), computing devices, and electrical connections to various components to control operations of the vehicle.

Some or all of the different components illustrated in FIG. 3 may be interchangeable with other components, for example to include different interior components associated with a pickup truck vehicle when compared to an interior 304 for different vehicle systems such as full size vans, which have vastly different interior styles and designs. In addition, different sub-types or trim styles may exist for the different vehicle types, providing further customization for components such as cloth versus leather seats and other such customizable options. The myriad options available for a single vehicle style are amplified by the ability to produce multiple different vehicle styles, greatly increasing the variety of components and configurations experienced at a station of the assembly line.

Figure 4:
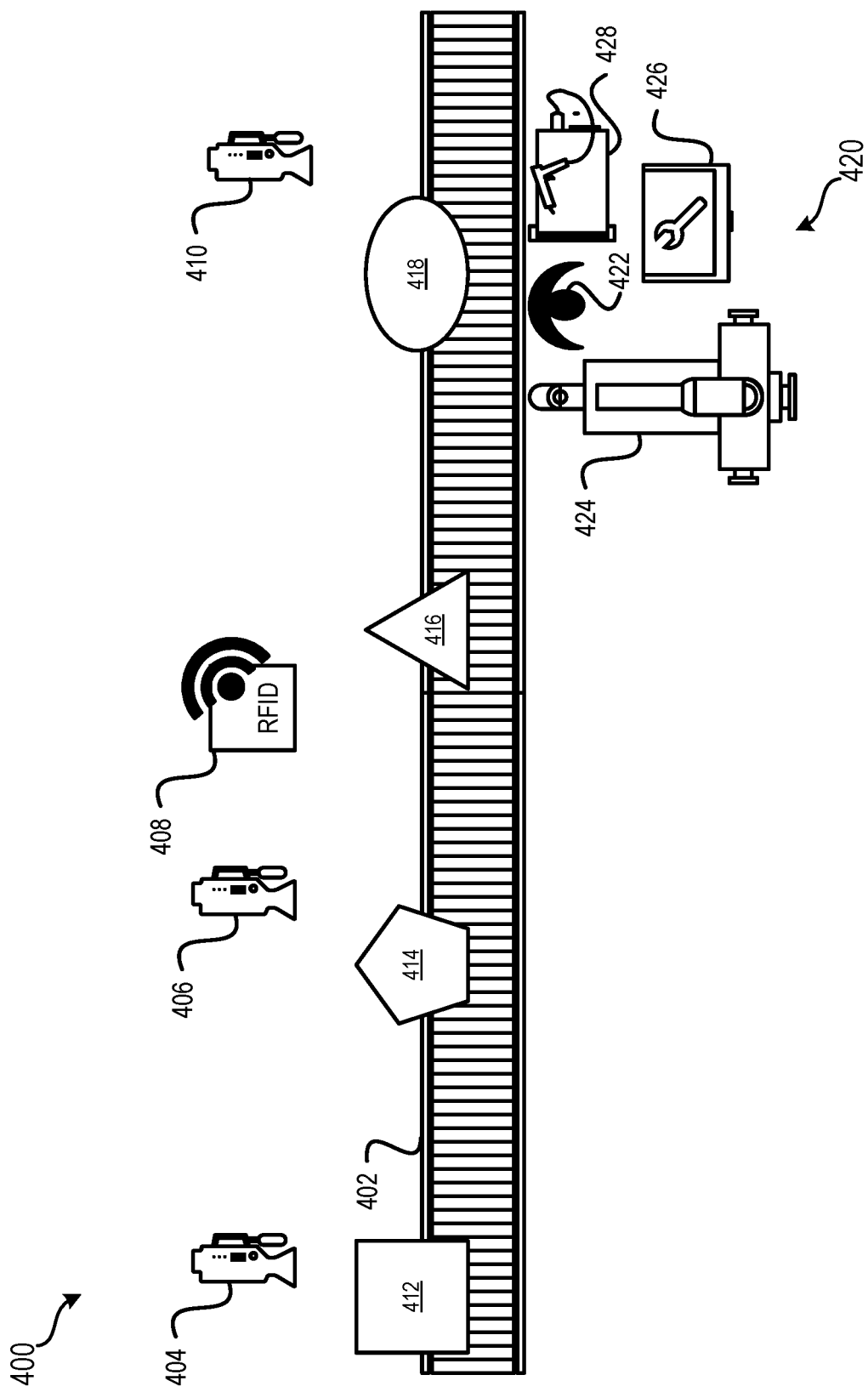
FIG. 4 illustrates a block diagram of an assembly line for assembling a flexible modular product, according to some embodiments.

FIG. 4 illustrates a block diagram of an assembly line 400 for assembling a flexible modular product, according to some embodiments. The assembly line 400 includes a conveyance system 402 for transporting one or more assembly items 412, 414, 416, and 418 along the assembly line 400 to and from stations 420 where procedures are completed on the assembly items 412, 414, 416, and 418. The conveyance system 402 may include any number of automated and manual conveyance devices such as belts, chain-drives, moving platforms, rolling platforms, and the like to advance assembly items along the conveyance system 402. The assembly items 412, 414, 416, and 418 may be different product variations of a product, such as the vehicle variations shown and described with respect to the vehicle system 200 of FIG. 2. In some examples, the order and arrangement of the assembly items 412, 414, 416, and 418 on the conveyance system 402 may be such that adjacent assembly items are of different product variations. In some examples the assembly items may be of similar or identical product variations to those adjacent on the conveyance system 402.

Along the conveyance system 402 may be a number of sensors 404, 406, 408, and 410 that detect data related to assembly items 412, 414, 416, and 418 on the conveyance system 402. The sensors 404, 406, 408, and 410 may include optical sensors, radio-frequency identification sensors (RFID), proximity sensors, and other such sensors to gather information from and about the assembly items 412, 414, 416, and 418 as they pass by on the conveyance system 402. For example, an RFID sensor may detect an RFID tag on one of the assembly items 416 as it passes by, the RFID tag associated with data describing the product variation of the assembly item, the location along the conveyance system, and other such data. In some examples an optical sensor may detect the presence of the assembly item or may detect a configuration of a part of the assembly item, for example to identify a bolt pattern or position of an element connected to the assembly item. The proximity sensor may detect a location of the assembly items along the conveyance system 402 and such data may be associated with a timestamp to identify a position along the conveyance system over time. Such data from the sensors 404, 406, 408, and 410 may be stored in a ledger, such as a distributed ledger, to produce a full assembly and configuration history for each assembly item. The sensors may be positioned at any interval along the assembly line 400 for gathering data on each of the assembly items 412, 414, 416, and 418.

In an illustrative example, the sensor 404 may be an optical sensor to detect the presence of an assembly item as it approaches station 420. The sensor 406 may be focused on a particular element of the assembly items, for example focused on a feature marked on the frame of a vehicle base indicating a length and width of the frame configuration, in instances such as the base 202 of FIG. 2. A sensor 408 may include an RFID sensor that interacts with an RFID tag connected to the assembly items, the RFID tag including product identification data corresponding to identifying information for the assembly item such as a vehicle identification number (VIN), a trim style, a body style, different customizable components, and the like. A sensor 410 may be positioned at or adjacent the exit of the station 420 and may be an optical sensor to visually confirm the presence of an item added to the assembly item at the station, such as the installation of a battery.

The sensors 404, 406, 408, and 410 are each in communication with a manager, such as a computing device over a network, wired or unwired, and may be capable of updating a peer ledger system with data from each sensor as the assembly items progress. In this manner, the peer ledger system receives various inputs into a distributed ledger that can be verified, encrypted, and otherwise ensured to be accurate to enable verification of proper installation, proper equipment, and also ensure the procedures are completed within a particular time frame. The data from the various sensors may also be used to control and/or adjust operation of the assembly line 400. For example, in some instances the conveyance system 402 may include multiple conveyance sections between different stations, each section independently controllable. upon detection of completion of a procedure, such as by confirming using a sensor 410, that a component is installed and/or that tools have completed enough cycles, for example having completed eight cycles for inserting and tightening eight bolts as part of a procedure. In such examples, the assembly item may be advanced out of the station 420 in advance of a scheduled movement or at a rate faster than prescheduled. In this manner, a subsequent assembly item may be advanced to the station 420 for work to begin. Due to the variations in the product configurations, subsequent assembly items may require varying time to complete procedures. For example, installing a battery in a small car may require fewer bolts and/or connections than installing a battery in a larger vehicle such as an SUV. By enabling dynamic movement of the conveyance system 402, the varied time to complete a procedure at station 420 can be accounted for and need not unnecessarily burden or slow down the assembly line 400.

In some examples, the sensor 410, particularly located at the exit of the station 420 may be configured to detect or gather data relating to a component adjusted or installed at the station 420. In some instances the sensor 410 may be connected to a computing device and implement computer vision techniques to identify, for example, bolt heads around a component and verify that all expected bolt heads are present. The computing device may then take further actions, such as to generate an alert or notification to check the component in the event a discrepancy is detected. Such information may be generated and presented in real-time and may also be stored in an audit log of the ledger including data indicating the discrepancy was resolved following follow-up actions.

The station 420 includes machinery 424, a first set of tools 426, and a second set of tools 428. A user 422 (e.g. a human operator, a robot, an AI driven system) may operate the machinery 424 and tools 426 and 428 at the station 420. The station 420 may also include a display and/or a computing device, or a connection to a computing device to provide instructions for tool selections and procedures to be performed at the station 420 to the assembly items.

The machinery 424, first set of tools 426, and second set of tools 428 may include stationary machines, such as lifting hoists, hand or powered tools such as pneumatic or electrically powered tools, and may include "smart" tools including sensors and connections to computing devices to enable tracking of, control of, configuration of, and location of the tools. The sensors and devices connected to the tools may enable tracking of usage data for the tools, the usage data including data related to the use of the tool such as current drawn, operation time, orientation, location, and other such data. Configuration of the tools may be accomplished based on a procedure to be performed. In some examples, a computing device manager may configure settings for the one or more tools automatically based on the procedure to be performed. In some examples, the tools may include a configurable tool with adjustable parameters, such as torque settings. For example, connecting some elements to vehicle bases may require a first torque setting of a torque wrench while connecting the elements to a second vehicle base requires a second torque setting. The torque setting may be adjusted based on the product variation and the procedure to be performed. The tools 426 and 428 may also be equipped with indicator lights or other notification elements (e.g. visual notification, tactile notification, audio notification) to draw attention to a particular tool of the tools 426 and 428. Such indicator may be activated when a tool is required for completion of a procedure at the station 420. In this manner, though a large variety of tools may be needed to accommodate non-standard components and equipment for different vehicle variations, proper tools can be readily identified and selected for use without error or confusion.

In some examples, the first set of tools 426 may each be outfitted with indicators that are positioned on a body of the tools. In some examples, the first set of tools 426 may be a tool array, such as in a tool box, on a tool wall, or otherwise arranged for visibility. Each tool may have an assigned location within the storage space and the assigned location may be identified using lights, sounds, or other indicators. In some examples the assigned locations may include sensors or devices to detect particular individual tools an differentiate between tools to ensure the tools are returned to their proper location in storage for subsequent use. For instance, the storage locations may include RFID sensors and each tool may include an RFID tag such that the tools can readily be differentiated from one another and properly identified. In some examples, RFID tags or other similar identification means may enable tools to be properly differentiated and identified even when not arranged in a set predetermined organization scheme. Additionally, a display at the station may include an identifier such as a name, color, or other identifier associated with a particular tool that may be presented along with procedure instructions at the station 420 for completion.

Figure 5:
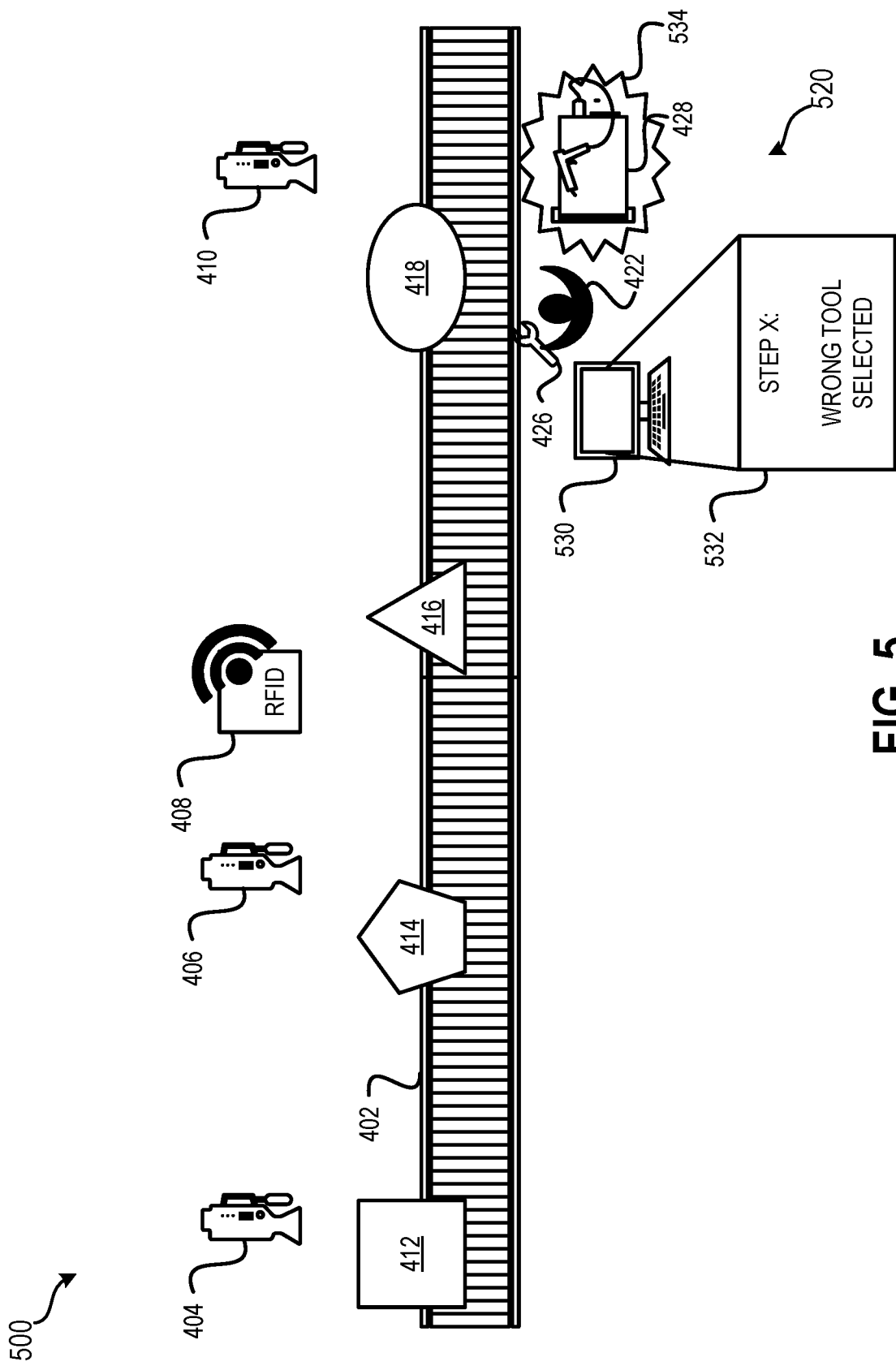
FIG. 5 illustrates the block diagram of the assembly line of FIG. 4 including tool notification alerts, according to some embodiments.

FIG. 5 illustrates the block diagram of the assembly line 500 including tool notification alerts on a display 530 as well as connected to an indicator-equipped tool. The assembly line 500 may include components described above with respect to assembly line 400 of FIG. 4 including the conveyance system 402 and sensors 404, 406, 408, and 410. The second set of tools 428 may be an indicator-equipped tool that includes an indicator device, such as a visual indicator including color-configurable lights. In some examples, the display 530 may provide information related to a procedure step to be performed at the station 520 as well as a tool selection. In some instances, such as with sensor-equipped tools and tool storage systems, the instructions may present instructions to select the second set of tools 428, and a visual indicator 534 such as a light array may illuminate on or around the second set of tools 428 to aid with correct tool selection. In the event that an incorrect tool is selected, the computing system may detect, using the sensor-equipped tools, that a tool other than the indicated tool has been selected. This may be performed by determining that an identity of a tool selected does not match an identity of a tool instructed for selection. In response, the computing system may display a notification 532 on the display 530, the notification 532 indicating that the wrong tool has been selected and directing attention to the correct tool, second set of tools 428. In addition, the notification 532 may also include a tool fault notification that is additionally stored in the distributed ledger, indicating use of an incorrect tool for the procedure or selection of the incorrect tool before the procedure is performed. The tool fault notification may include data flagging the procedure for follow-up.

As described above with respect to using a distributed ledger to confirm data related to the assembly items 412, 414, 416, and 418, the distributed ledger may be updated and confirmed with respect to tool instructions and selections. Errors such as incorrect tool selections may be logged and flagged for follow-up or correction. Additionally, sensors connected to tools may verify completion of tasks, such as completion of a number of cycles, a time period of use of the tool, and other such data to verify the procedure was properly completed.

Figure 6:
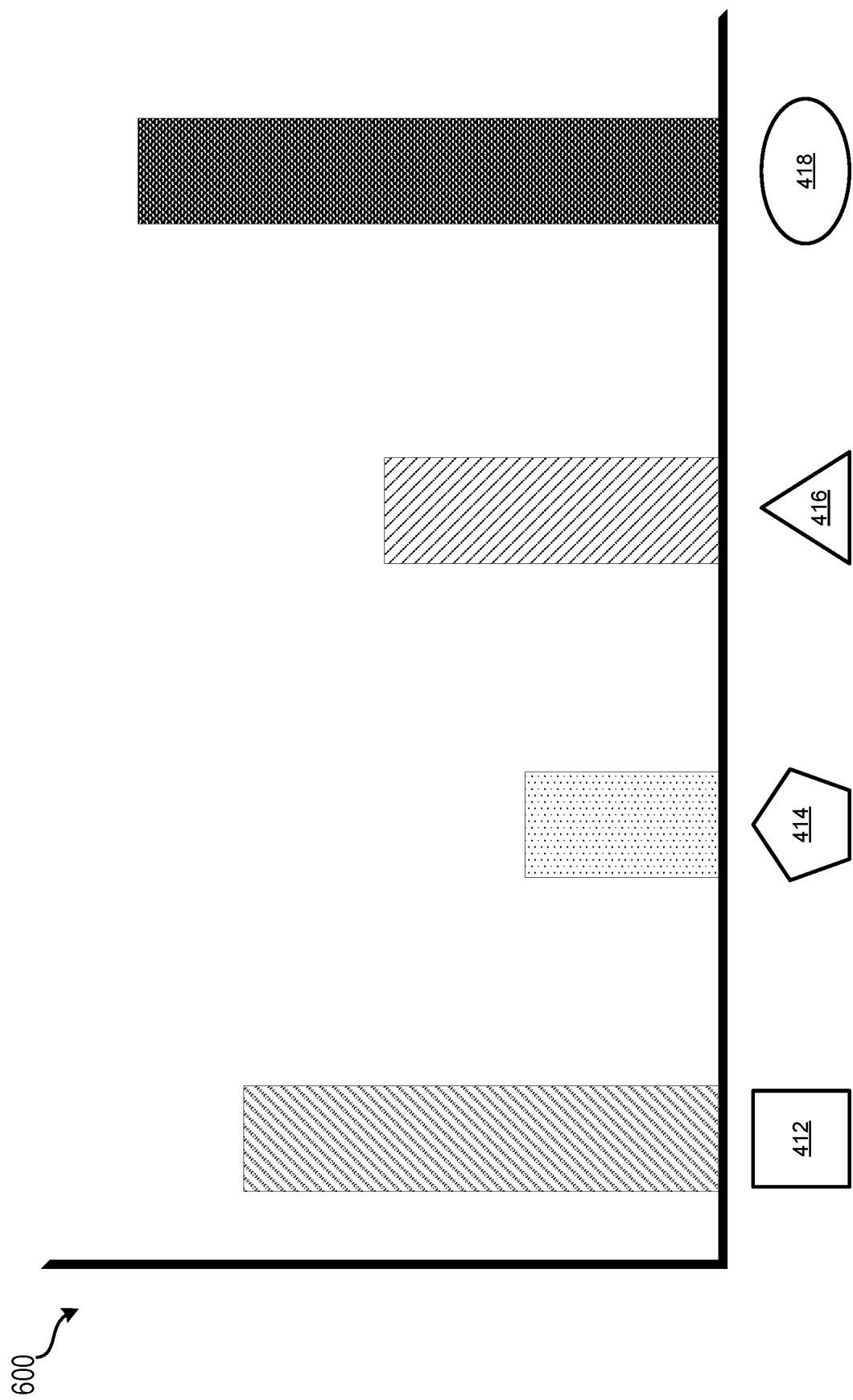
FIG. 6 illustrates a diagram showing interaction time at a station of the assembly line of FIG. 4, according to some embodiments.

FIG. 6 illustrates a diagram 600 showing interaction time at a station of the assembly line 400 of FIG. 4, according to some embodiments. As described above with respect to FIG. 4, different procedures for different product variations at the same station may be completed in varying amounts of time based on complexity or number of components, which can differ with different variations. The diagram illustrates an example of time that may be required to complete a particular procedure, such as a battery installation. In assembly item 414, for example, the procedure may be completed quickly, such as when few connectors are involved. In other assembly item 418, however, the procedure to install the battery may be more time intensive due to additional connectors required to install. The conveyance system 402 may be controlled based on an actual or estimated completion time for each procedure. For instance, after logging data corresponding to the procedure for a product variation, the conveyance system 402 may be controlled based on the estimated or expected time to complete the procedure.

In some examples, the expected time to complete a procedure may differ, by some value, from the elapsed time to complete the procedure. The difference may be greater than a certain threshold, and in such instances may indicate that the procedure was only partially completed or some error or problem was encountered. Such data and information may be added to the distributed ledger, including follow-up data resolving or confirming the completion of the procedure. In some examples, in the event that the elapsed time exceeds the expected time for the procedure, a notification may be generated at the station to indicate the procedure it taking too much time. In some examples, in response to the elapsed time exceeding the expected time, the speed or movement of the conveyance system may be adjusted to account for the additional time required, for example by slowing the conveyor as described herein or adjusting the expected time for the procedure.

Figure 7:
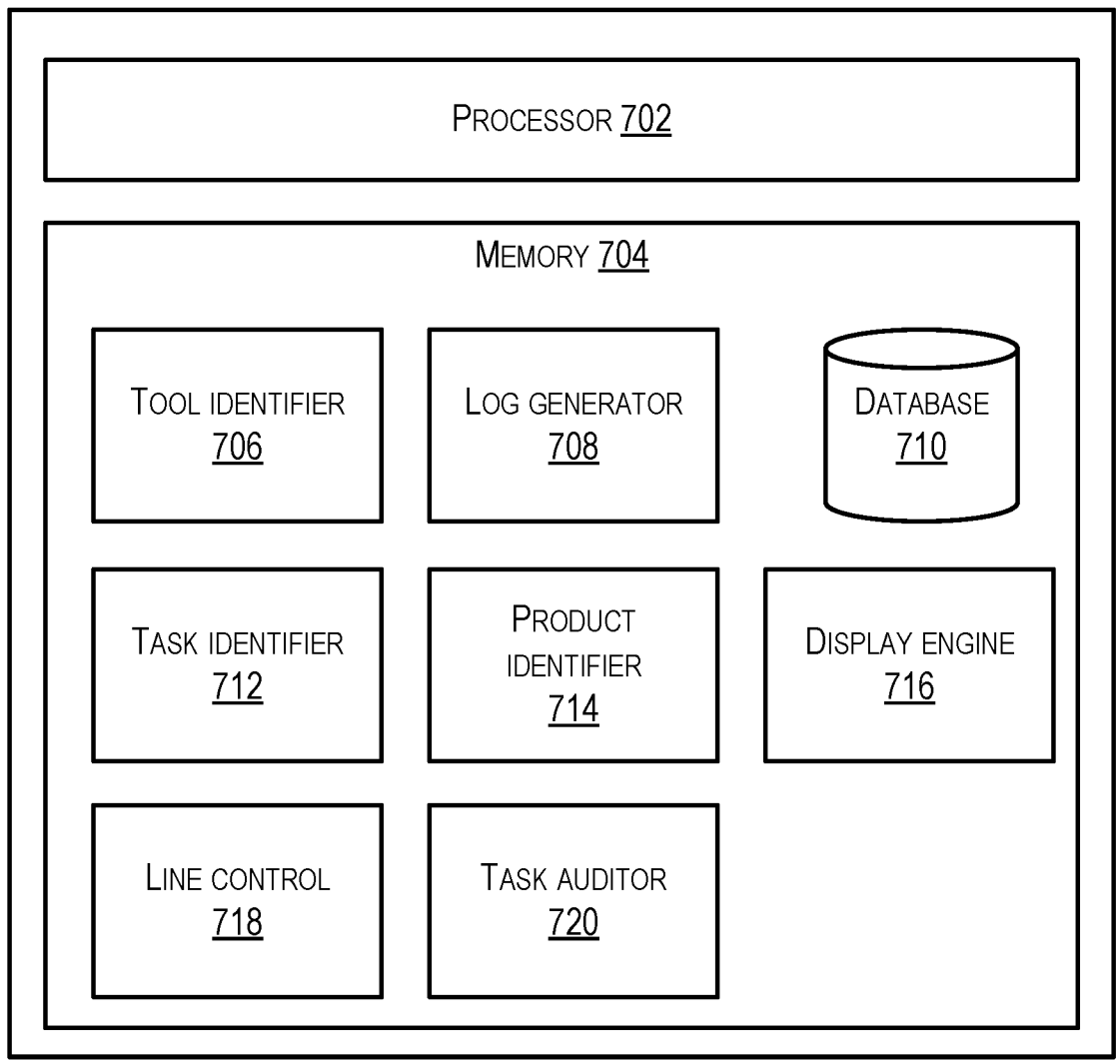
FIG. 7 illustrates a block diagram of a system architecture for controlling operations of the assembly line and generating an audit report, according to some embodiments.

FIG. 7 illustrates a block diagram of a system architecture for a computing device 700 for controlling operations of the assembly line and generating an audit report, according to some embodiments. In some examples, the computing device 700 may be an example of the computing device 900 or cloud computing system 1000 of FIGS. 9 and 10. Additionally, elements included within the computing device 700 may, in some examples be implemented as separate elements, such as individual software elements or may be implemented in a combined manner, for example with a single software package enabling the actions of one or more elements of the computing device 700.

The computing device 700 includes a processor 702 and a memory 704. The processor 702 may be a single processor or a number of processors, such as arranged in a computing system such as a server system and/or the cloud computing system 1000 of FIG. 10. The memory 704 may be a non-transitory memory including instructions for carrying out different methods and steps described herein. The processor 702 may execute the instructions from the memory 704 that cause the processor 702 to perform various actions of the methods and steps.

In particular, the memory 704 may include a tool identifier 706, a log generator 708, a database 710, a task identifier 712, a product identifier 714, a display engine 716 a line controller 718, and a task auditor 720. In some embodiments, the memory 704 may include multiple different memory devices or partitions. In some embodiments, the modules and elements described with respect to memory 704 may not be stored as independent elements or modules, but may be stored in any suitable configuration.

The tool identifier 706 identifies a tool out of a set of tools at a station required to complete a procedure. The tool identifier 706 may receive information such as the product variation of the assembly item, the equipment involved, the connectors involved, tools to interact with the particular variants of the assembly item, and other such data. The tool identifier 706 may also generate instructions to instruct selection of the tools required. This may involve, for example communicating with a light controller to cause an illumination element associated with the tool to illuminate. The tool identifier 706 may identify a used tool, the used tool being the tool selected at the station. The tool identifier 706 may also identify, as described above with respect to FIGS. 4 and 5, when the correct tool is selected or, in the alternative, when an incorrect tool is selected.

The log generator 708 may generate log information, such as log information to be stored in the distributed ledger. The log generator 708 may be implemented in different examples at different nodes of the system, such as the nodes shown and described with respect to FIG. 1. For example, each element may include a log generator capable of generating data to store in the distributed ledger based on sensor or other associated data from each element. The log generator 708 may instruct recordation of the data on the distributed ledger and also confirm data on the distributed ledger.

The database 710 may store information related to the operations of the assembly line such as the locations of stations, tools available at each station, positions of sensors, types of sensors, product variation options, and other such data that may be accessed by one or more elements within the memory 704 to determine elements needed or required, such as the tools required to complete particular procedures for different variations.

The task identifier 712 may identify a task or procedure to be performed at the station. The procedure may be identified form a set of procedures, for example including procedures stored at the database 710. The task identifier 712 may identify the procedure to be performed based on the product variation, the steps required for each different variation, and the like.

The product identifier 714 may identify an identify or configuration of an assembly item. the product identifier may access identifying information in response to receiving identification data from an identification sensor and access data related to the VIN, configuration, elements included in the product variation, and other such details.

The display engine 716 may output data to a display, such as the display 530 at the station 520. The display engine 716 may receive information, such as tool identity information from the tool identifier 706 and present such information at the station 520 to aid in selection of the tool as identified by the tool identifier.

The line controller 718 may control operation of the conveyance system 402. The conveyance system may be dynamically controlled as described herein or may be controlled based on preset parameters and characteristics such as an advancing speed of the conveyance system and time delays.

The task auditor 720 may audit procedures performed at the stations. The task auditor may compare an expected time to complete a procedure against an elapsed time to audit completion of the procedure. The task auditor 720 may also receive sensor data at the exit of the station to confirm completion of the procedure. The task auditor 720 may implement computer vision techniques to audit completion of the procedure. The task auditor 720 may audit in other ways and audit other performance of the system and store such audit information in the distributed ledger, via the log generator 708. The distributed ledger thereby becomes a complete, accurate, and verified complete history of all procedures and elements of a final product off the assembly line.

Figure 8:
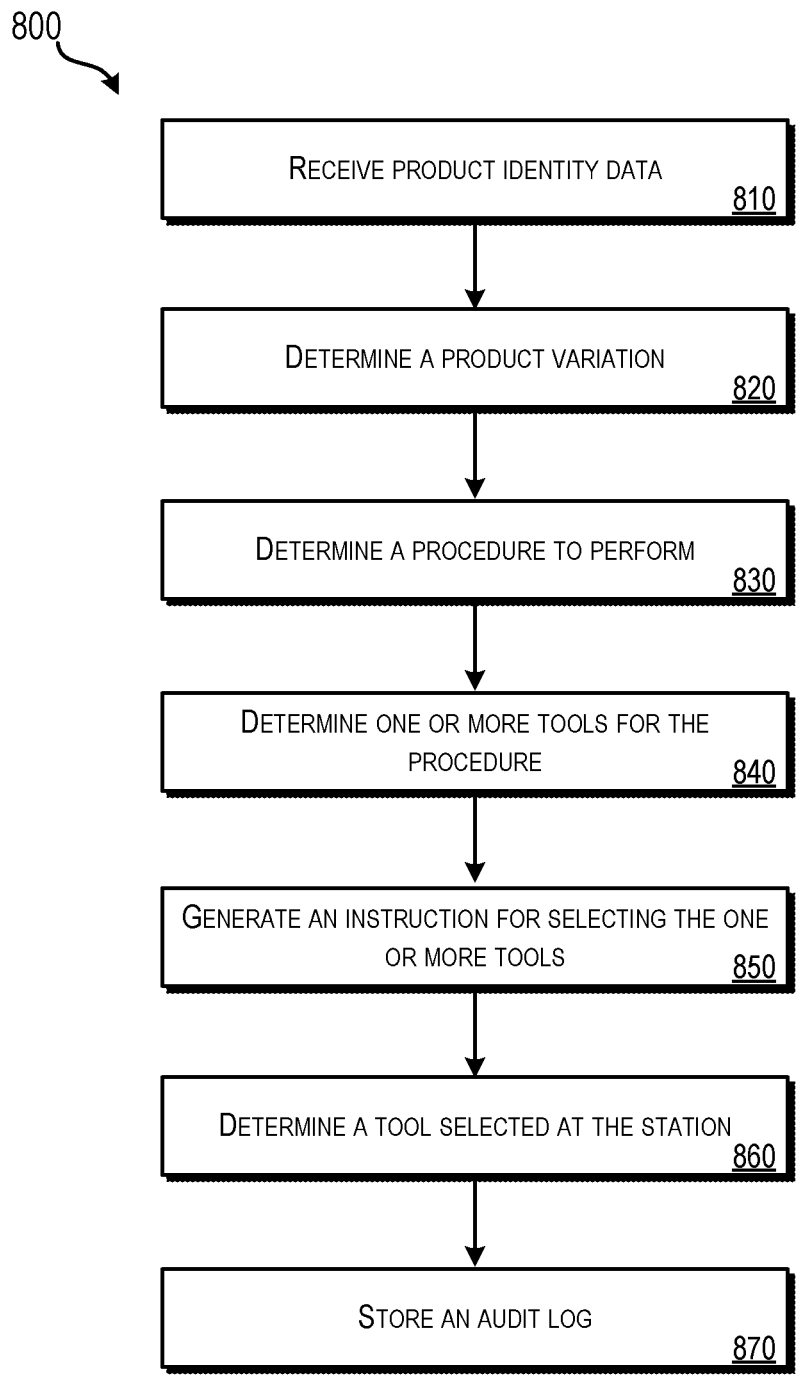
FIG. 8 illustrates a block diagram depicting a method for tool selection at a station of the assembly line, according to some embodiments.
Figure 9:
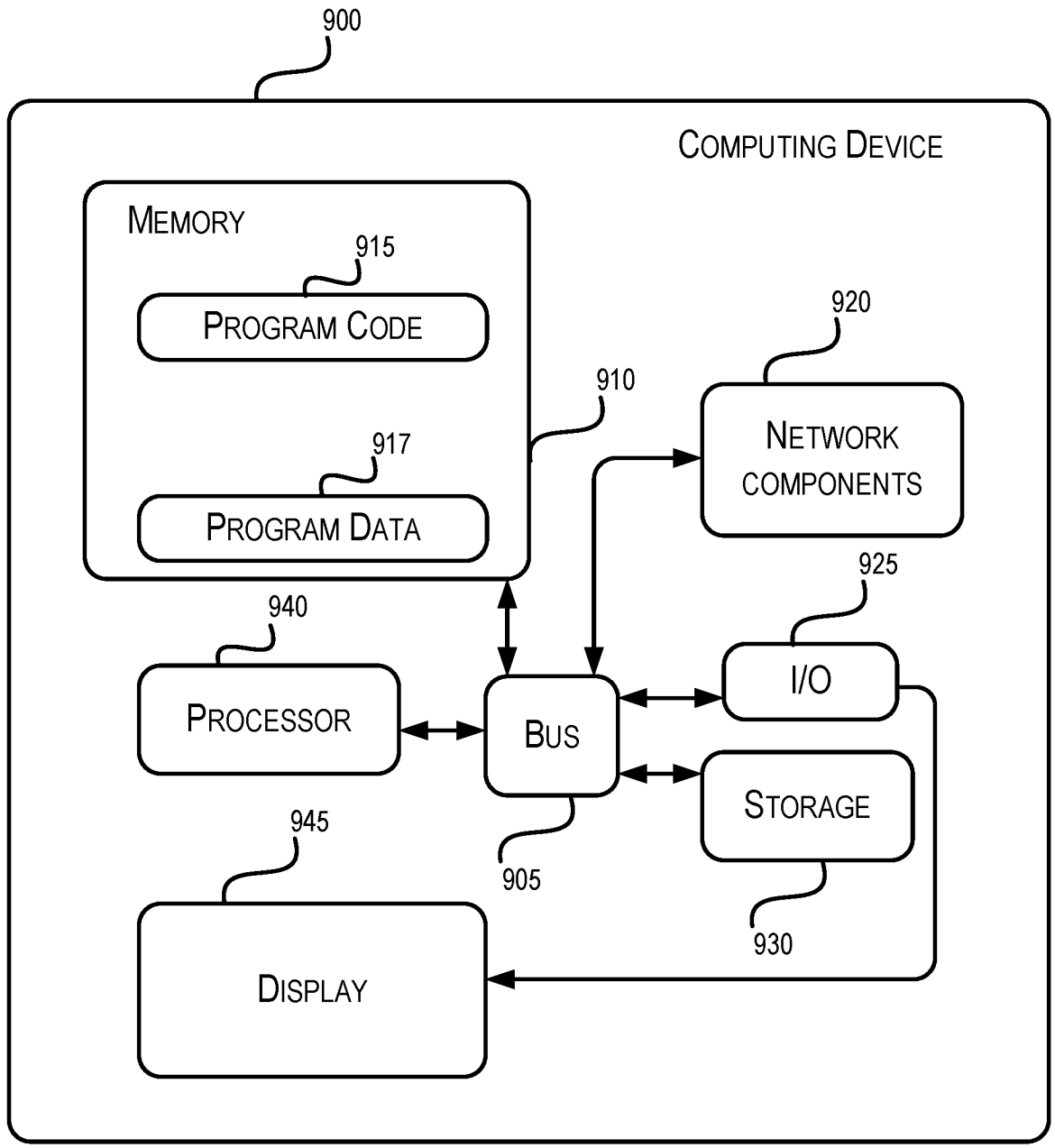
FIG. 9 illustrates a block diagram of a computing system, according to some embodiments.

FIG. 8 illustrates a block diagram depicting a method 800 for securing usage of variable tools at a station of the assembly line, according to some embodiments. Any suitable computing system or group of computing systems can be used for performing the operations or methods described herein. For example, FIGS. 7 and 9 depict examples of computing devices 700 and 900 that may be at least a portion of a computing system to perform the operations or methods described herein.

At 810, the method 800 includes receiving product identity data. The product identity data may be received from a sensor positioned on or adjacent the assembly line. The sensor may detect identifying information related to the assembly item on the assembly line. The identifying information may subsequently be used to identify a product variation or configuration of components. In some examples, the product identity data may be produced by a computer vision system based on analysis of optical sensor data of the assembly item to identify features of the assembly item.

At 820, the method 800 includes determining a product variation. The product variation may be accessed from a database based on the product identity data, such as a VIN number. The product variation may be determined according to a computer vision technique that may be used to identify a configuration of a base for a vehicle or other such information, such as the length and width of the frame.

At 830, the method 800 includes determining a procedure to perform. The procedure to perform may be determined from a predetermined set of procedures. The procedure is based on the product variation and the station at which the procedure is to be performed. For example, after determining that the assembly item is for a full size van, the correct procedure for installing seats may be selected from among a set of procedures for installing seats at a particular station.

At 840, the method 800 includes determining one or more tools for the procedure. The one or more tools for the procedure may be accessed from a database and is based on the product variation and the procedure performed. Tasks requiring particular tools may be associated together in a database such that the tools may be known based on the product variation and the type of procedure to be performed.

At 850, the method 800 includes generating an instruction for selecting the one or more tools. The instruction may be presented at a display at the station along the assembly line. The instruction may identify a particular tool, a location of the tool, and a configuration of the tool such as a torque setting. The instruction may identify the tools by illuminating or otherwise indicating a particular tool for selection.

At 860, the method 800 includes determining a tool selected at the station. The tool selected at the station may be determined based on tool sensors providing information as to the use, handling, movement of, or other data related to the use of or selection of a particular tool. In some examples, the method 800 may include determining incorrect selection of a tool and instructing selection of the proper tool in addition to notification of the incorrect tool selection.

At 870, the method 800 includes storing an audit log. The audit log includes information from each of the elements along the assembly line and indicates the state of different procedures, confirmation of completion, confirmation of tool selection, and other such data related to the use of the assembly line for future access. The audit log may be stored in a distributed ledger such that each element along the assembly line is in communication and enables confirmation of each data element added to the audit log and preventing alteration of the audit log after recording.

Typical assembly lines are ill-equipped to handle assembly of flexible product variations, especially in a dynamically changing manner, where subsequent products may be of entirely different variations without a rest of the assembly line. The systems and methods described above enable increased efficiency, speed, and accuracy for an assembly line producing flexible modular products. The accuracy of the assembly line and confidence in the assembly line is increased through the use of audit logs of a distributed ledger including data associated with the vehicle variation, confirmation of hardware components and software components added to the vehicle, and audit logs of the manufacturing steps. The systems and methods described herein provide a robust method to exchange equipment at tools at a single station of the assembly line for different variations of a flexible modular platform. Due to the variations possible in the flexible modular platform, dynamic changes with respect to vehicle type produced, equipment used, tools used, and procedures performed may vary dynamically with different vehicles along the assembly line.

The description provided above leverages different sensor systems and fuses information from the different sensor systems via a distributed ledger to secure interactions between the various vehicles produced on the assembly line and the equipment and tools at the assembly station. The use of the distributed ledger introduces verification possibilities as well as encryption possibilities which reduce the likelihood of incorrect installation or other potential errors that may be introduced along the assembly line. To improve confidence and robustness in the flexible modular platform assembly line, the distributed ledger is used to exchange data between networking peers including stations of the assembly line, sensors, tools, and hardware of the flexible modular platforms. Additional benefits of the systems and methods described herein include increased trust as described previously, improved response time, improved accuracy, and ease of action at stations of the assembly line.

FIG. 9 illustrates a block diagram of an example of a computing device 900. Computing device 900 can be any of the described computers herein including, for example, computing device 700 of FIG. 7. The computing device 900 can be or include, for example, an integrated computer, a laptop computer, desktop computer, tablet, server, or other electronic device.

The computing device 900 can include a processor 940 interfaced with other hardware via a bus 905. A memory 910, which can include any suitable tangible (and non-transitory) computer readable medium, such as RAM, ROM, EEPROM, or the like, can embody program components (e.g., program code 915) that configure operation of the computing device 900. Memory 910 can store the program code 915, program data 917, or both. In some examples, the computing device 900 can include input/output ("I/O") interface components 925 (e.g., for interfacing with a display 945, keyboard, mouse, and the like) and additional storage 930.

The computing device 900 executes program code 915 that configures the processor 940 to perform one or more of the operations described herein. Examples of the program code 915 include, in various embodiments logic flowchart code 915 described with respect to FIG. 1 above. The program code 915 may be resident in the memory 910 or any suitable computer-readable medium and may be executed by the processor 940 or any other suitable processor.

The computing device 900 may generate or receive program data 917 by virtue of executing the program code 915. For example, sensor data, trip counter, authenticated messages, trip flags, and other data described herein are all examples of program data 917 that may be used by the computing device 900 during execution of the program code 915.

The computing device 900 can include network components 920. Network components 920 can represent one or more of any components that facilitate a network connection. In some examples, the network components 920 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 920 can be wired and can include interfaces such as Ethernet, USB, or IEEE 1394.

Although FIG. 9 depicts a computing device 900 with a processor 940, the system can include any number of computing devices and any number of processors. For example, multiple computing devices or multiple processors can be distributed over a wired or wireless network (e.g., a Wide Area Network, Local Area Network, or the Internet). The multiple computing devices or multiple processors can perform any of the steps of the present disclosure individually or in coordination with one another.

Figure 10:
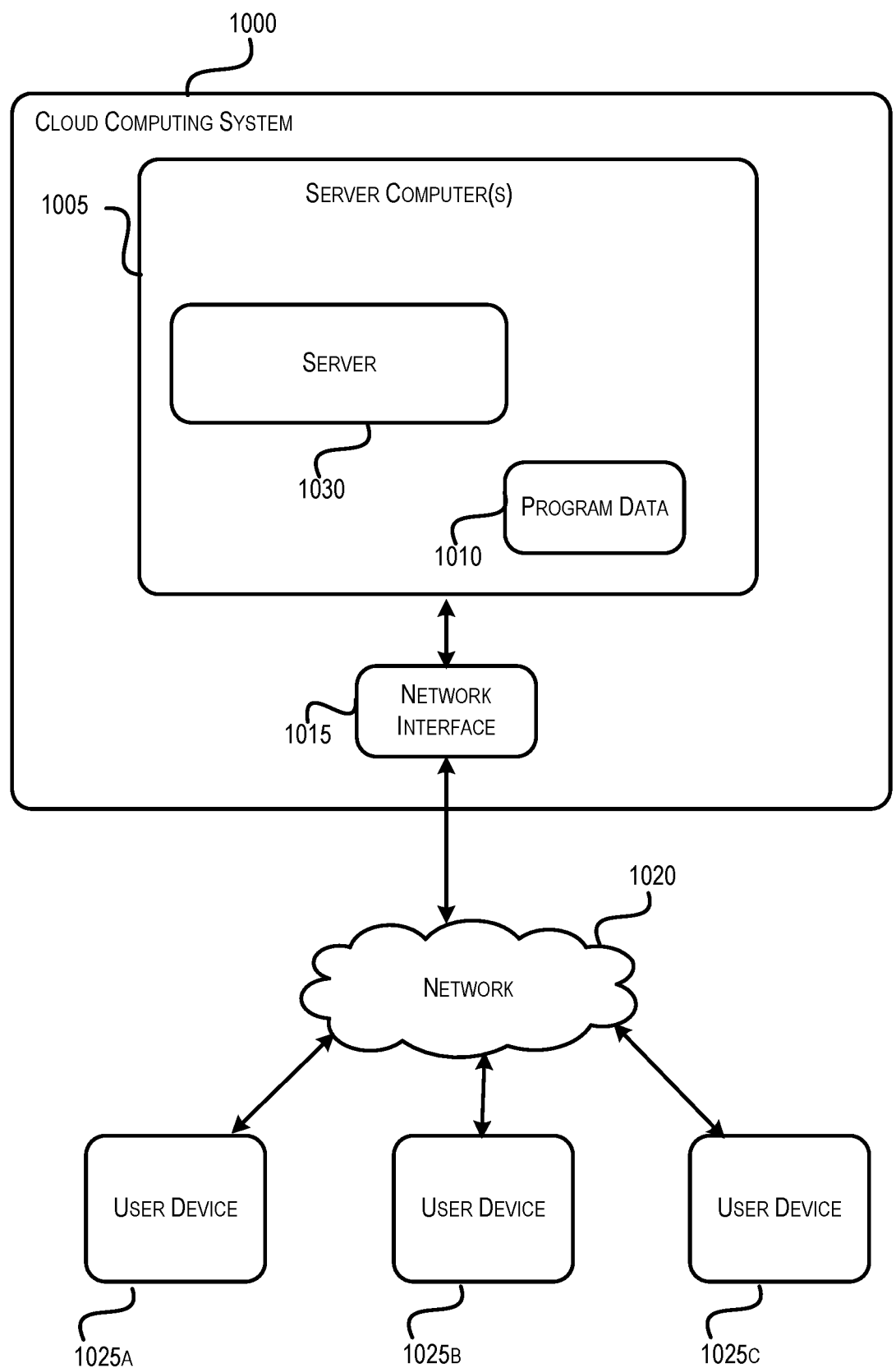
FIG. 10 illustrates a cloud computing system, according to some embodiments.

In some embodiments, the functionality provided by the computing device 900 may be offered as cloud services by a cloud service provider. For example, FIG. 10 depicts an example of a cloud computing system 1000 offering an intelligence service that can be used by a number of user subscribers using user devices 1025a, 1025b, and 1025c across a data network 1020. User devices 1025a, 1025b, and 1025c could be examples of a computing device 900 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 1005.

The remote server computers 1005 include any suitable non-transitory computer-readable medium for storing program code (e.g., server 1030) and program data 1010, or both, which is used by the cloud computing system 1000 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1005 can include volatile memory, non-volatile memory, or a combination thereof.

One or more of the server computers 1005 execute the program data 1010 that configures one or more processors of the server computers 1005 to perform one or more of the operations that determine locations for interactive elements and operate the adaptive rule-based system. As depicted in the embodiment in FIG. 10, the one or more server computers 1005 provide the services to perform the adaptive rule-based system via the server 1030. Any other suitable systems or subsystems that perform one or more operations described herein (e.g., one or more development systems for configuring an interactive user interface) can also be implemented by the cloud computing system 1000.

In certain embodiments, the cloud computing system 1000 may implement the services by executing program code and/or using program data 1010, which may be resident in a memory device of the server computers 1005 or any suitable computer-readable medium and may be executed by the processors of the server computers 1005 or any other suitable processor.

In some embodiments, the program data 1010 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 1020.

The cloud computing system 1000 also includes a network interface device 1015 that enable communications to and from cloud computing system 1000. In certain embodiments, the network interface device 1015 includes any device or group of devices suitable for establishing a wired or wireless data connection to the data networks 1020. Non-limiting examples of the network interface device 1015 include an Ethernet network adapter, a modem, and/or the like. The server 1030 is able to communicate with the user devices 1025a, 1025b, and 1025c via the data network 1020 using the network interface device 1015.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. An assembly system for producing a plurality of product variations of a product, the assembly system comprising:
a station having a plurality of tools for assembling the plurality of product variations of the product, wherein a set of tools is compatible with a specific product variation among the plurality of product variations, wherein each product variation is a different combination of (1) a first component selected among a plurality of first components, (2) a second component selected among a plurality of second components, and (3) a third component selected among one or more third components, wherein a first set of tools is compatible with a first product variation among the plurality of product variations of the product, and a second set of tools is compatible with a second product variation among the plurality of product variations of the product, wherein one of the first set of tools and the second set of tools include at least one tool that is not included in the other one of the first set of tools and second set of tools, wherein the station is configured to manufacture all product variations with different combinations of the first component, the second component and the third component;
a conveyance system to carry an assembly item into and away from the station;
a sensor positioned upstream of the station configured to detect the assembly item on the conveyance system and gather product identity data related to the assembly item; and
a computing device comprising:
a processor; and a non-transitory memory having instructions stored thereon that, when executed by the processor, cause the processor to:
receive the product identity data of the assembly item from the sensor;
determine that a product variation of the assembly item is the first product variation based on the product identity data;
determine a procedure to perform at the station based on a station type and the first product variation;
determine one or more tools of the first set of tools required for the procedure, wherein the one or more tools are compatible with the first product variation;
generate an instruction, for display at the station, instructing selection of the one or more tools of the first set of tools;
determine a used tool of the first set of tools at the station based on tool data;
generate an audit log describing the used tool and the procedure performed at the station; and
store the audit log in a distributed ledger with an identifier associated with the assembly item.

2. The assembly system of claim 1, wherein the first set of tools comprise sensor-equipped tools, and wherein determining the used tool comprises receiving usage data from one or more of the tools of the first set of tools, the usage data indicating use at the station.

3. The assembly system of claim 1, wherein the distributed ledger including the product identity data, sensor data, the used tool, and the procedure performed.

4. The assembly system of claim 1, further comprising a tool storage system comprising:
the plurality of tools; and
one or more visual indicators associated with each tool of the plurality of tools, and wherein generating the instruction comprises causing a visual indicator associated with the one or more tools to instruct selection of the one or more tools.

5. The assembly system of claim 1, wherein the plurality of tools comprises a configurable tool, the configurable tool having an adjustable parameter to adjust usage of the configurable tool based on a product variation and the procedure to be performed and wherein the non-transitory memory comprises further instructions that, when executed by the processor, cause the processor to additionally configure the adjustable parameter based on the product variation of the assembly item and the procedure to be performed at the station.

6. A method for assembling a plurality of product variations of a product on a conveyance system, the method comprising:
receiving product identity data from a sensor positioned upstream of a station of the conveyance system;
determining that a product variation is a first product variation among the plurality of product variations based on the product identity data, wherein each product variation is a different combination of (1) a first component selected among a plurality of first components, (2) a second component selected among a plurality of second components, and (3) a third component selected among one or more third components, wherein the station is configured to manufacture all product variations with different combinations of the first component, the second component and the third component;
determining a procedure to perform at the station based on a station type and the first product variation;
determining one or more tools required to perform the procedure, wherein a set of tools is compatible with a specific product variation among the plurality of product variations, wherein the one or more tools are among a first set of tools that is compatible with the first product variation among the plurality of product variations of the product, wherein a second set of tools is compatible with a second product variation among the plurality of product variations of the product, wherein one of the first set of tools and the second set of tools include at least one tool that is not included in the other one of the first set of tools and second set of tools;
generating an instruction, for display at the station, instructing selection of the one or more tools from the first set of tools stored at the station;
determining a tool selected at the station to perform the procedure; and
storing an audit log in a distributed ledger, the audit log comprising the product identity data, the product variation, and the tool selected at the station.

7. The method of claim 6, further comprising:
comparing an identity of the tool selected at the station against the one or more tools instructed; and
generating a notification in response to the identity of the tool selected at the station not matching an identity of the one or more tools instructed.

8. The method of claim 7, further comprising storing a tool fault notification in the audit log in response to the identity of the tool selected at the station not matching an identity of the one or more tools instructed.

9. The method of claim 6, further comprising:
determining a time elapsed for performing the procedure at the station; and
storing the time in the audit log.

10. The method of claim 6, further comprising
determining an expected time for the performing the procedure at the station; and
controlling an advancing speed of the conveyance system based on the expected time for performing the procedure.

11. The method of claim 10, further comprising:
determining a time elapsed for performing the procedure at the station; and
generating a notification at the station in response to the time elapsed exceeding the expected time, and wherein controlling the advancing speed of the conveyance system is further based on the time elapsed.

12. The method of claim 6, wherein generating the instruction instructing selection of the one or more tools comprises illuminating an indicator associated with the one or more tools.

13. A non-transitory computer-readable medium having instructions stored thereon that, when executed by one or more processors, cause the one or more processors to:
receive product identity data for an assembly item from a sensor positioned upstream of an assembly station along a conveyance system;
determine that a product variation is a first product variation among a plurality of product variations for the assembly item based on the product identity data, wherein each product variation is a different combination of (1) a first component selected among a plurality of first components, (2) a second component selected among a plurality of second components, and (3) a third component selected among one or more third components, wherein the station is configured to manufacture all product variations with different combinations of the first component, the second component and the third component;

determine a procedure to perform at the assembly station based on a station type of the assembly station and the first product variation;

determine one or more tools of a set of tools stored at the assembly station required to perform the procedure, wherein a set of tools is compatible with a specific product variation among the plurality of product variations, wherein the one or more tools are among a first set of tools that is compatible with the first product variation among the plurality of product variations, wherein a second set of tools is compatible with a second product variation among the plurality of product variations, wherein one of the first set of tools and the second set of tools include at least one tool that is not included in the other one of the first set of tools and second set of tools;

generate an instruction, for display at the assembly station, instructing selection of the one or more tools from the first set of tools stored at the assembly station;

determine a tool selected at the assembly station to perform the procedure; and store an audit log in a distributed ledger, the audit log comprising the product identity data, the product variation, and the tool selected.

14. The non-transitory computer-readable medium of claim 13, further comprising additional instructions that, when executed by the one or more processors, cause the one or more processors to:

compare an identity of the tool selected at the assembly station against the one or more tools instructed; and generate a notification in response to the identity of the tool selected at the assembly station not matching an identity of the one or more tools instructed.

15. The non-transitory computer-readable medium of claim 13, further comprising additional instructions that, when executed by the one or more processors, cause the one or more processors to:

determine an expected time for the performing the procedure at the assembly station; and control an advancing speed of the conveyance system based on the expected time for performing the procedure.

16. The non-transitory computer-readable medium of claim 13, further comprising additional instructions that, when executed by the one or more processors, cause the one or more processors to:

configure an adjustable parameter of a configurable tool of the one or more tools based on the product variation and the procedure to be performed at the assembly station.

17. The non-transitory computer-readable medium of claim 13, further comprising additional instructions that, when executed by the one or more processors, cause the one or more processors to:

determine a time elapsed for performing the procedure at the assembly station; and store the time elapsed in the audit log.

18. The assembly system of claim 1, further comprising:

a plurality of sensors provided along the conveyance system and configured to detect data associated with the assembly item, wherein the data includes a location of the assembly item along the conveyance system, and a timestamp identifying the location along the conveyance system over time, wherein the non-transitory memory comprises further instructions that, when executed by the processor, cause the processor to:

store the data associated with the assembly item collected using the plurality of sensors in the distributed ledger.

19. The assembly system of claim 1, wherein each one of the first component, the second component and the third component is one of a base structure, a top hat structure, and an interface.

* * * * *